_United States Patent Office_ 2,916,490
Patented Dec. 8, 1959

2,916,490

3-AMINO-INDAN-COMPOUNDS

Martin Schenck, Berlin-Frohnau, and Helmer Richter, Berlin-Grunewald, Germany, assignors to Firma Schering A.G., Berlin, Germany No Drawing. Application December 19, 1955
Serial No. 554,099

Claims priority, application Germany November 6, 1953

13 Claims. (Cl. 260—247)

The present invention relates to new and useful 3-amino-indan compounds and methods of producing the same.

This application is a continuation-in-part of our copending application Serial No. 466,458, filed November 2, 1954, now abandoned, and entitled "3-Amino Indan Compounds."

It is an object of the present invention to produce new and useful 3-amino-indan compounds.

It is another object of the present invention to provide novel 3-amino-indan compounds which have valuable therapeutic action and which have the possibility of providing a new series of pharmacological products, and to methods of producing these products.

Other objects and advantages of the present invention will be apparent from a further reading of the specification and of the appended claims.

With the above objects in view, the present invention mainly comprises as a new composition of matter, an amino-indan compound having the following structural formula:

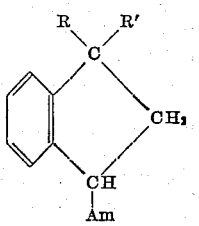

wherein the benzene ring of the indane system may be substituted by alkyl and alkoxyl radicals or by the hydroxyl group and wherein R is selected from the group consisting of hydrogen, alkyl, aralkyl and alicyclic radicals, wherein R' is selected from the group consisting of alkyl, aryl, alkaryl, hydroxyaryl, alkoxyaryl, aralkyl and alicyclic radicals, and wherein Am is selected from the group consisting of the amino group, mono-substituted amino groups substituted by alkyl, aryl, aralkyl, alkaryl, and alicyclic radicals, di-substituted amino groups substituted by alkyl, aryl, aralkyl, alkaryl and alicyclic radicals, and 5 and 6 member saturated nitrogen-containing heterocyclic radicals.

Thus, R may be a hydrogen atom, or an alkyl group such as methyl, ethyl, propyl, butyl, amyl and the like; R may be an aralkyl radical such as benzyl, phenylethyl, naphthylmethyl, and the like; or R may be an alicyclic radical such as cyclopropyl, cyclobutyl, cyclopentyl, cyclohexyl, cycloheptyl and the like.

Likewise, R' may be an alkyl radical such as methyl, ethyl, propyl, butyl, amyl and the like; or R' may be an aryl radical such as phenyl, biphenyl, naphthyl and the like; or R' may be an alkaryl group such as o-, m-, or p-toluyl, ethylphenyl, propylphenyl, isopropylphenyl, xylyl, cymyl, and the like; or R' may be an alkoxyaryl radical such as o-, m-, or p-methoxyphenyl, ethoxyphenyl, propyloxyphenyl, butyloxyphenyl, and the like; or R' may be an aralkyl or alicyclic radical of the type mentioned above for the group R, or R' may be a hydroxyaryl such as o-, m- or p-hydroxyphenyl.

It is to be noted that the above examples of different organic radicals for R and R', respectively, are illustrative only and that other equivalent groups may be substituted. It should further be noted that in the case of R and R' only one of the groups may be a hydrogen atom and where both groups are the same type of radical such as when both are alkyl radicals, they may be the same or different radicals.

Most preferably R is a hydrogen atom or a lower alkyl radical of up to 4 carbon atoms. Most preferably R' is a lower alkyl group of not more than 4 carbon atoms, e.g. methyl, ethyl, propyl, isopropyl and butyl, or an aryl, alkaryl or alkoxyaryl group of not more than 10 carbon atoms, e.g., phenyl, toluyl, ethylphenyl, propylphenyl, isopropylphenyl, xylyl, cymyl, methoxyphenyl ethoxyphenyl, propyloxyphenyl, and the like.

As stated above, the group Am may be the amino group or a primary or secondary amino group, or a heterocyclic nitrogen-containing radical. Most preferably, Am is the unsubstituted amino group or is a mono- or di-substituted amino group substituted by a lower alkyl group of not more than 4 carbon atoms. In the case of the secondary amines, the substituted alkyl groups may be the same or different groups. It is also preferred that the group Am be a saturated 5 or 6 member heterocyclic nitrogen-containing radical.

As examples of the suitable groups represented by Am may be mentioned, the mono-alkyl amino groups such as methylamino, ethylamino, propylamino, isopropylamino and butylamino; the secondary amino groups such as di-methylamino, diethylamino, di-n-propylamino, diisopropylamino, dibutylamino, or mixed dialkylamino groups such as methylethylamino, ethylpropylamino, methylbutylamino, and the like; and the saturated heterocyclic radicals such as piperidino, pyrrolidino, morpholino, oxazolidino, thiazolidino, piperazino, and the like.

In addition to providing the new group of chemical compounds herein specified, the present invention also provides methods of producing the same. As will be seen, although all of the compounds mentioned may be separated as such, it is often more feasible to separate their acid addition salts such as the hydrochloride addition product of the compound rather than the pure compound itself, which acid addition product may be used per se if derived from a non-toxic acid or otherwise may be further treated to obtain the pure product. The present invention therefore comprises not only the above-specified compounds but also their acid addition products, preferably the addition products with non-toxic acids.

The present invention provides for the production of the products specified above starting from either of two primary compounds:

(a) A 3-halogen indan compound having the formula:

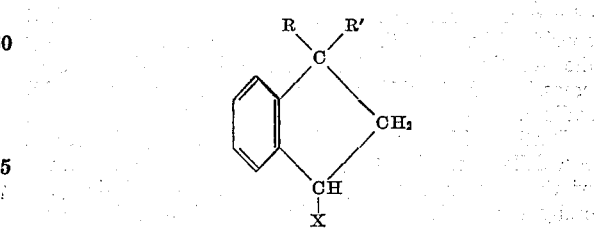

wherein R is selected from the group consisting of hydrogen, alkyl, aralkyl and alicyclic radicals, wherein R' is selected from the group consisting of alkyl, aryl, alkaryl, aralkyl, hydroxyaryl, alkoxyaryl and alicyclic radicals, and wherein X is a halogen atom, is treated with ammonia or a primary or secondary amine to directly produce the desired reaction product.

(b) Starting with a compound of the formula:

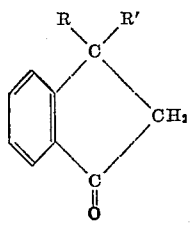

the compound is treated either:

(1) With hydroxyl amine to convert the keto group to the oxime and then reduce to the corresponding amine; or (2) By direct reductive amination in the presence of ammonia or a corresponding primary or secondary amine.

The product produced by any of the methods described above which is a primary or secondary 3-amino-indane may be converted to the final desired N-substituted 3-amino-indane by normal N-alkylation.

The product produced according to the present invention has been found to have non-predictable interesting pharmacological properties and may find application in the development of new and valuable medicines.

The 1-substituted 3-halogen indanes which are the necessary starting products for the process described under (a) above can easily be produced in technically suitable manner from the corresponding indan-3-one substituted in the 1-position in the necessary manner, which are obtainable according to Auwers (described in Bericht der Deutschen Chemischen Gesellschaft, volume 52, page 110), by catalytic hydrogenation (for example in the presence of Raney nickel catalyst according to the process described in the German Patent No. 912,093 and subsequently converting the thus obtained indan-3-ol by hydroxyl exchange with a halogenation agent such as thionyl chloride, preferably in an inert solvent, for example chloroform. Instead of substituting chlorine for the hydroxyl group, another halogen atom such as iodine or bromine may be substituted.

The conversion of these halogen products with ammonia or amines according to the process described under (a) above is more particularly set forth in Examples 1–5.

The conversion of the 3-keto-indan compounds according to the process (b) 2 above is more particularly set forth in Examples 7 and 8.

The possibly required step of later N-alkylation is more particularly set forth and described in Example 6.

When starting with a compound referred to under (a) above, it is essential to exclude water since the presence of a small percentage of water already reduces the yield considerably. It is therefore advisable to thoroughly dry the reacting amines, for instance by pre-drying over potassium hydroxide and subsequent treatment with sodium.

Starting with a compound according to (b) above, and especially according to (b) 1, is advantageous because of the greater simplicity of the process and the generally better yield. The reductive amination is accomplished with hydrogenation catalysts, preferably with nickel catalysts, whereby the reaction occurs already under normal conditions, that is without the use of increased pressure and temperature. The great yield is surprising, since it was known that α-phenyl ketones and similar compounds usually give only moderate to medium yields upon reductive amination. Up to now it was therefore assumed that the reactivity of the keto group is reduced by the presence of a ring in the molecule. (See: Neuere Methoden der Präparativen Organischen Chemie, volume I, page 106, Verlag Chemie, 1943.) This may be the reason why the process of reductive amination until now has not been used with respect to 3-keto-indan compounds.

The new compounds of the present invention, which are made technically available by the method of the present invention have very important, interesting and unpredictable pharmacological characteristics. The compounds of the present invention have spasmolytic effects. These effects become manifest especially in respect of the stomach, intestines and bile system. Thus the new compounds 1-phenyl-1-methyl-3-dimethylamino-indan, 1-phenyl-1-methyl-3-diethylamino-indan, 1-p-ethoxyphenyl-3-diethylamino-indan, 1-methyl-3-methylamino-indan, 1-phenyl-3-dimethylamino-indan, 1-phenyl-3-diethylamino-indan and 1-phenyl-methyl-3-piperidino-indan are nearly always more effective against bariumchloride- and Lentin (=carbaminoylcholin)-cramps than paverine, whilst they are at the same time less toxic. Partly the spasmolytic effect of Dolantin (i.e. 1-methyl-4-phenyl-4-carbethoxypiperidine) is even surpassed.

The compounds of the present invention also have the effect of influencing the blood circulation by causing dilation of the blood vessels. This effect on the blood circulation is particularly important from the practical standpoint. It possesses the particular property of coronary vessel dilation of the type produced by the product "Khellin" (see Arzneimittelforschung, Oulendorf in Wurttemberg, 3rd year (1953), page 177. This applies especially to 1-p-methoxyphenyl-3-dimethylamino-indan, 1-p-ethoxyphenyl-3-diethylamino-indan, 1-phenyl-1-methyl-3-diethylamino-indan and 1-p-ethoxyphenyl-3-morpholino-indan. Some compounds of the present invention have an even greater activity than "Khellin" as e.g. the 1-p-ethoxyphenyl-3-diethylamino-indan and in addition are less toxic. A further advantage of the compounds of the present invention is the water solubility of their acid salts.

Many compounds of the present invention have also been found to be effective as local anaesthetics, and in addition to being therapeutic agents themselves these compounds are useful as starting products for the preparation of other therapeutic agents.

The following examples are given to further illustrate the present invention, the scope of the invention, not however being limited to the specific details of the examples.

EXAMPLE 1

For the production of 1-phenyl-3-chlorindan, 10 grams of 1-phenyl-indanol-(3) are reacted with 6.7 grams of thionyl chloride in chloroform (free of alcohol and water) at a temperature of 50° C. After evaporation under vacuum at 50° C. the residue is taken up with ether and the solution is washed consecutively with an aqueous solution of bicarbonate, water and saturated sodium chloride solution. For better drying the residue is left for some time under vacuum at 50° C. The thus obtained crude 1-phenyl-3-chlorindan can be directly reacted with amines. The crystallized 1-phenyl-3-chlorindan, after recrystallization in hexane, has a melting point of between 59° and 62° C. Under prolonged storage it slowly decomposes. 22.5 grams of 1-phenyl-3-chlorindan are left together with an excess of dimethylamine (25 grams) in a pressure bottle for 24 hours. The dimethylamine serves at the same time as solvent for the 1-phenyl-3-chlorindan. Thereafter the amine is evaporated at room temperature and the residue taken up with water and ether. The still adhering dimethylamine and the dimethylamine hydrochloride are removed in a separatory funnel by washing of the ether solution with water. In order to isolate the 1-phenyl-3-dimethylamine-indan it is possible to proceed in one of the following ways:

(a) The ethereal solution is dried with potassium carbonate and the 1-phenyl-3-dimethylamine-indan is precipitated by means of ethereal hydrochloric acid as its hydrochloride salt, or (b) The 1-phenyl-3-dimethylamine-indan is fractionally extracted from its ethereal solution with hydrochloric acid, for instance 1 N HCl and the fractions are evaporated on a steam bath. In this way oily substances are obtained which become crystalline after rubbing with acetone.

The isolated substances may be dissolved in alcohol and precipitated with ether. Drying is done under vacuum at 110° C. over phosphorous pentoxide. If for instance a crude 1-phenyl-indanol-(3) is used for chlorination, and method (b) is followed, after the reaction with dimethylamine, separate fractions with varying melting points ranging between 140° and 195° C. are obtained. However, if 1-phenyl-indanol-(3) having a melting point of between 92° and 94° C. is used and method (a) is followed, a substance with a melting point between 159° and 164° C. is obtained. This 1-phenyl-3-dimethylamine-indan-hydrochloride contains ½ mol of water of crystallization.

EXAMPLE 2

10.7 grams of crude 1-phenyl-3-chlorindan prepared from crude 1-phenyl-indanol-(3) are treated with 25 cc. of piperidine and left for 24 hours at room temperature. The excess piperidine is distilled-off under vacuum at low temperature (50° C.). The remainder is taken up with water and benzene, and the solution in benzene is washed with water until neutral. It is then extracted in fractions with 1 N hydrochloric acid. The residues from the evaporation of the individual fractions are ground with acetone and filtered under suction. After recrystallization from a solution in butanol the 1-phenyl-3-piperidyl-indan-hydrochloride has a melting point of between 246° and 248° C.

EXAMPLE 3

12.4 grams of crude 1-phenyl-3-chlorindan made from 11 grams of 1-phenyl-indanol-(3) are reacted with an excess of diethylamine, the latter serving at the same time as solvent. The reaction takes place in a bomb tube at 80° C. Thereafter the excess amine is distilled-off at low temperature under vacuum and the residue is taken up with water and ether. The ethereal solution is washed with water until neutral and then extracted with aqueous hydrochloric acid. The base is precipitated with bicarbonate from the acid solution, then again taken up in ether and dried over potassium carbonate. Thereafter, the ether is carefully distilled-off under vacuum and exclusion of air. 7.9 grams of a colorless oil are obtained in this way. The oil is converted into the neutral tartrate of the 1-phenyl-3-diethylamino-indan. The melting point of between 68° and 93° C. after drying over phosphorous pentoxide is not of characteristic significance since the compound is present as a cis-trans-isomeric mixture.

EXAMPLE 4

*Preparation of 1-methyl-1-phenyl-3-dimethylamine-indan-hydrochloride*

As starting material the hitherto not described 1-methyl-1-phenyl-indanol-(3) is required which can be prepared by hydrogenation according to C. F. Koelsch, Journ. Am. Chem. Soc. 65, 59 (43). For instance 38.6 grams of 1-methyl-1-phenyl-indanone-(3) dissolved in 260 cc. of methanol are hydrogenated with Raney-nickel as a catalyst at 40° C. under normal pressure. After working up, 38 grams of 1-methyl-1-phenyl-indanol-(3) are obtained which, due to being a cis-trans-isomeric mixture, melts over an extended range of temperature (90° to 115° C.). The isomeric mixture of the 1-methyl-1-phenyl-indanol-(3) is then used for the further reaction.

Reacting 1-methyl-1-phenyl-3-chlor-indan with dimethylamine:

12.8 grams of crude 1-methyl-1-phenyl-3-chlor-indan, obtained from 11.7 grams of 1-methyl-1-phenyl-indanol-(3) by reaction with thionyl chloride dissolved in chloroform, are left together with a surplus of water-free dimethylamine for 12 hours at room temperature in a pressure bottle. After evaporation of the dimethylamine, the residue is taken up with water and ether. The solution in ether is then washed with water until neutral and thereafter dried over potassium carbonate. The hydrochloride of the 1-methyl-1-phenyl-3-dimethylamino-indan is precipitated with ethereal hydrochloric acid and recrystallized from butanol-ether. At first 3.4 grams of a compound having a melting point of between 228° and 231° C. crystallize from the solution. After working up the mother liquor an additional 5.8 grams of a substance having a melting point of between 180° and 186° C are obtained. The two crystallized substances are cis-trans-isomers.

EXAMPLE 5

*Preparation of 1-methyl-1-phenyl-3-diethylamino-indan-hydrochloride*

14 grams of crude 1-methyl-1-phenyl-3-chlor-indan prepared from 11.7 grams of 1-methyl-1-phenyl-indanol-(3) are reacted with an excess of water-free diethylamine in a bomb tube at 80° C. After evaporation of the excess amine under vacuum, the residue is taken up with water and ether. The ethereal solution is washed with water until neutral and then extracted with aqueous hydrochloric acid. After alkalization with bicarbonate, the base is again taken up with ether and the ethereal solution dried over potassium carbonate. The hydrochloride of the 1-methyl-1-phenyl-3-diethylamino-indan is precipitated with ethereal hydrochloric acid. For purification the hydrochloride is recrystallized from butanol-ether. Melting point 156° to 162° C.

EXAMPLE 5a

*Preparation of 1-methyl-1-phenyl-3-morpholino-indan-hydrochloride*

For the production of 1-methyl-1-phenyl-3-brom-indan 10 grams of 1-methyl-1-phenyl-indanol-(3), dissolved in 20 cm.³ chloroform, are reacted with 4.4 grams of phosphorous tribromide, in a manner similar to that described in Example 11. The crude 1-methyl-1-phenyl-3-brom-indan is mixed with 20 cm.³ morpholine, heated at a temperature of 60° C. for several hours and taken up with water and ether. The solution in ether is washed with water until neutral and thereafter dried over potassium carbonate. The hydrochloride of the 1-methyl-1-phenyl-3-morpholino-indan is precipitated with ethereal hydrochloric acid. It is a mixture of isomerides having a melting point of between 115° and 160° C.

The mixture of isomerides is recrystallized from butanol-ether. At first 3.2 grams of a compound having a melting point of between 227° and 233° C. crystallize from the solution. After working up the mother liquor an additional 4.3 grams of a substance having a melting point of between 109° and 126° C. are obtained. The corresponding free bases show a melting point of between 90° and 97° C. and of between 72° and 81° C., respectively.

EXAMPLE 6

10 grams of 1-phenyl-1-methyl-indanon-(3) are dissolved in 30 cc. of pyridine and treated with a solution of 3.8 grams of hydroxylamine hydrochloride in 12 cc. diluted alcohol. The reaction solution is left for 48 hours at room temperature and then stirred into 150 cc. of water. The oxime precipitates at first as an oil which solidifies upon grinding. The precipitate is then sucked off and washed with water. After recrystallization from methanol, the oxime melts between 169° to 172° C. 7.5 grams of the 1-phenyl-1-methyl-indanon-(3)-oxime are hydrogenated in 150 cc. of methanol, containing 1.3 grams of hydrogen chloride, at 50° C., under normal pressure, using palladium pipe as catalyst. After 3 hours the amount of hydrogen taken up corresponds to 2 mols of $H_2$. After separation from the catalyst the filtrate is evaporated under vacuum. The residue remaining is 1-phenyl-1-methyl-3-amino-indan hydrochloride which is re-precipitated from methanol-ether. Melting point between 275° and 278° C. (with decomposition).

The primary amine can be dimethylated to 1-phenyl-1-methyl-3-dimethyl-amino-indan by treatment with formic acid of 90% concentration and an excess of 38% formaldehyde.

EXAMPLE 7

10.4 grams of 1-phenyl-indanon-(3), equal to 0.05 mol, are hydrogenated under normal conditions in 50 cc. of methanol and 4.7 grams of methylamine, using 1 gram Raney nickel. 0.85 mol of $H_2$ are taken up. After separation of the catalyst, the reaction mixture is evaporated until dry and taken up in ether. In case of turbidity, filtration with carbon is performed. The hydrochloride is obtained by adding ethereal hydrochloric acid. The yield is 10.1 grams of 1-phenyl-3-methylamino-indan-hydrochloride, or 80.5% of the theoretical yield. The melting point lies between 221° and 223° C.

EXAMPLE 8

10.4 grams of 1-phenyl-indanon-(3) in 50 cc. of methanol are hydrogenated under normal conditions with 6.8 grams of dimethylamine, using Raney nickel. 0.83 mol of $H_2$ are taken up. After working up, the hydrochloride of the isomeric mixture of 1-phenyl-3-dimethyl-amino-indan is precipitated with ethereal hydrochloric acid. The melting point lies between 160° and 171° C.

EXAMPLE 9

*Preparation of 1-methyl-1-phenyl-3-piperidino-indan-hydrochloride*

By reacting 1-methyl-1-phenyl-3-chlor-indan with piperidine instead of dimethylamine as described in Example 4 the 1-methyl-1-phenyl-3-piperidino-indan is obtained. The hydrochloride melts at 197–201°.

EXAMPLE 10

*Preparation of 1-p-methoxyphenyl-3-diethylamino-indan-hydrochloride*

21 g. of 1-p-methoxyphenyl-indanol-(3) is reacted with 20 cc. of alcohol-free chloroform and 8.2 g. of phosphorous tribromide. This mixture is left for 1 hour at room temperature and then heated for an additional 1½ hours and under refluxing. After cooling, the reaction solution is washed with water and then dried over calcium chloride. The solution is then evaporated under vacuum.

The residue is reacted with 20 cc. of diethylamine and heated for several hours at boiling. The reaction mixture is taken up in ether and water and washed with water until the wash water reacts neutral. The ether solution is dried over potassium carbonate (which had previously been subjected to a heating to glowing treatment).

Subsequently the hydrochloride of the 1-p-methoxyphenyl-3-diethylamino-indane is precipitated by the addition of ethereal hydrochloric acid. The crude hydrochloride is dissolved in water and decolorized with carbon. The base which is precipitated from the clear filtrate with sodium carbonate solution is taken up in ether and the hydrochloride is obtained by the addition of ethereal hydrochloric acid to the dried ether extract. The hydrochloride is dried under vacuum at 50° C. The melting point is not characteristic and is equal to 108°–130° C.

The 1-3-methoxyphenyl-indanol-(3) utilized as starting material can be made in the following manner from the known beta-phenyl-beta-p-methoxyphenyl-propionic acid:

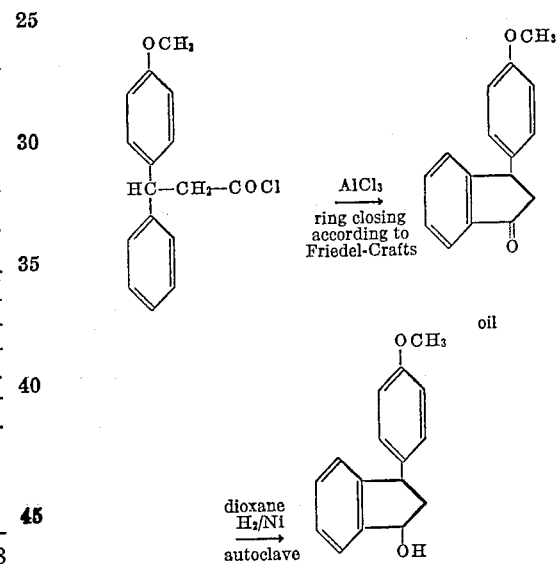

EXAMPLE 11

3.5 g. of 1-p-ethoxyphenyl-indanol-(3) is reacted with 10 cc. of alcohol-free chloroform and 1.4 g. of phosphorous tribromide. The reaction mixture is allowed to stand for 1 hour at room temperature and then heated for an additional 1½ hours under refluxing. After cooling the separated phosphorous acid is poured-off and the solution is concentrated under vacuum. The residue is reacted with 10 cc. of diethylamine and heated to boiling under refluxing for 1 hour.

The reaction mixture is then taken up in ether and water and washed with water until the wash water reacts neutral. The ether solution is dried over potassium carbonate (which had previously been subjected to a heating to glowing treatment). Subsequently the hydrochloride of the 1-p-ethoxyphenyl-3-diethylamino-indane is precipitated by the addition of ethereal hydrochloric acid. The oily precipitated hydrochloride is separated from the carried along ether solution and subjected to an after-washing with ether. The 1-p-ethoxyphenyl-3-diethyl-amino-indan-hydrochloride is solidified in a vacuum desiccator over potassium hydroxide and concentrated sulfuric acid. The melting point is not characteristic and is equal to 60°–76° C.

The 1-p-ethoxyphenyl-indanol-(3) which is used as starting material can be obtained from p-ethoxybenzhydrol in the following way:

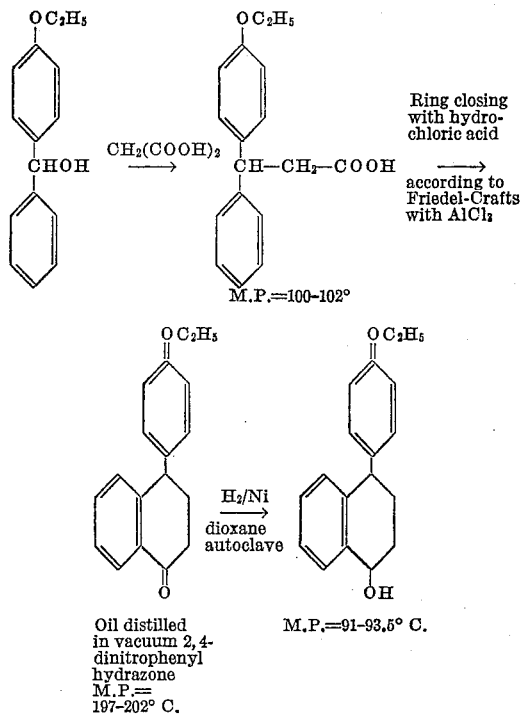

EXAMPLE 12

By reacting 1-p-ethoxyphenyl-indanol-(3) with phosphorous tribromide followed by reaction with morpholine instead of diethylamine, as described in Example 15, the 1-p-ethoxyphenyl-3-morpholino-indanhydrochloride, a hygroscopic substance, is obtained.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. A compound selected from the group consisting of an aminoindan free base having the following structural formula:

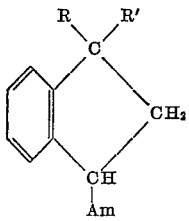

wherein R is selected from the group consisting of hydrogen and lower alkyl radicals; wherein R' is selected from the group consisting of phenyl and lower alkoxy phenyl radicals when R is a lower alkyl radical, and from the group consisting of lower alkyl, phenyl and lower alkoxyphenyl radicals when R is hydrogen; and wherein Am is selected from the group consisting of the amino group, mono-substituted amino groups substituted by a lower alkyl radical, di-substituted amino groups substituted by lower alkyl radicals, and the piperidino and morpholino radicals; and non-toxic acid addition salts of the free base.

2. As a new composition of matter, an amino-indan compound having the following structural formula:

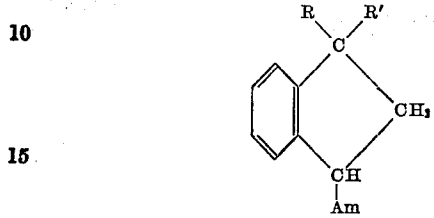

wherein R is a lower alkyl radical; wherein R' is the phenyl radical; and wherein Am is the amino group.

3. As a new composition of matter, an amino-indan compound having the following structural formula:

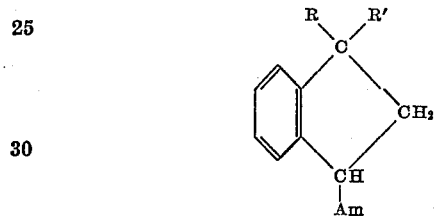

wherein R is a lower alkyl radical; wherein R' is the phenyl radical; and wherein Am is a di-substituted amino group substituted by lower alkyl radicals.

4. As a new composition of matter, an amino-indan compound having the following structural formula:

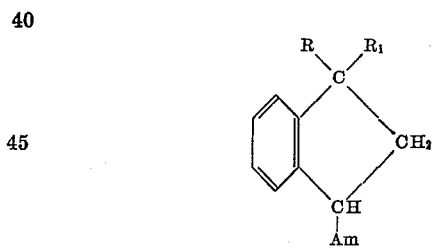

wherein R is a hydrogen atom; wherein R' is a lower alkoxy phenyl radical; and wherein Am is the amino group.

5. As a new composition of matter, an amino-indan compound having the following structural formula:

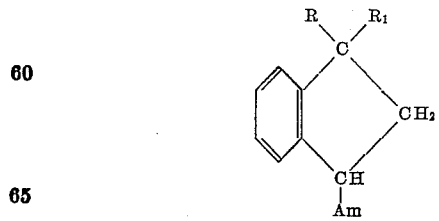

wherein R is a lower alkyl radical; wherein R' is the phenyl radical; and wherein Am is the morpholino radical.

6. As a new composition of matter, 1-phenyl-1-methyl-3-diethylamino-indan.

7. As a new composition of matter, 1-phenyl-1-methyl-3-piperidino-indan.

8. As a new composition of matter, 1-phenyl-3-methyl-amino-indan.

9. As a new composition of matter, 1-p-ethoxy-phenyl-3-diethylamino-indan.

10. As a new composition of matter, 1-p-ethoxyphenyl-3-morpholino-indan.

11. As a new composition of matter, 1-methyl-1-phenyl-3-morpholino-indan.

12. As a new composition of matter, 1-phenyl-3-dimethylamino-indan.

13. As a new composition of matter, 1-p-methoxyphenyl-3-diethylamino-indan.

References Cited in the file of this patent

Goo-On: J. Org. Chem., vol. 19, pp. 305–311 (March 1954).

Beilstein's Handbook of Organic Chemistry, vol. XII, 2nd Supplement, pp. 652–653.

Gagnon et al.: Canadian Journal of Research, vol. 22B, No. 2, pp. 32–44.